(12) United States Patent
Zhao et al.

(10) Patent No.: US 9,831,763 B2
(45) Date of Patent: Nov. 28, 2017

(54) CAPACITOR DISCHARGE CIRCUIT FOR POWER SUPPLY EMI FILTERS

(71) Applicant: Shanghai SIM-BCD Semiconductor Manufacturing Co., Ltd., Shanghai (CN)

(72) Inventors: An Dong Zhao, Shanghai (CN); Zheng Ying, Shanghai (CN)

(73) Assignee: Shanghai SIM-BCD Semiconductor Manufacturing Co., Ltd., Shanghai (CN)

( * ) Notice: Subject to any disclaimer, the term of this patent is extended or adjusted under 35 U.S.C. 154(b) by 0 days.

(21) Appl. No.: 14/871,201

(22) Filed: Sep. 30, 2015

(65) Prior Publication Data

US 2016/0241135 A1    Aug. 18, 2016

(51) Int. Cl.
*H02M 1/44*    (2007.01)
*H02M 1/32*    (2007.01)

(52) U.S. Cl.
CPC ........ *H02M 1/44* (2013.01); *H02M 2001/322* (2013.01)

(58) Field of Classification Search
CPC .................... H02M 1/44; H02M 2001/322
See application file for complete search history.

(56) References Cited

U.S. PATENT DOCUMENTS

| 2013/0147440 A1* | 6/2013 | Shiroyama ............ G01R 31/40 320/166 |
| 2014/0153301 A1* | 6/2014 | Wang ................... G01R 19/175 363/52 |

* cited by examiner

*Primary Examiner* — Jue Zhang
(74) *Attorney, Agent, or Firm* — Kilpatrick Townsend & Stockton LLP (57) ABSTRACT

A discharging circuit for a power supply includes a rectifying circuit for coupling to an input filter capacitor coupled to an AC input voltage for providing a rectified AC voltage. A discharge resistor is coupled to the rectifying circuit, and a power switch and a discharging current source are coupled in series with the discharging resistor. A discharge control circuit is coupled to the discharge resistor for providing a discharge signal to cause the power switch to turn on for discharging the capacitor using the discharging current source. The discharging control circuit includes an AC voltage sampling circuit for providing a sampled rectified voltage, a signal-shaping circuit for providing a time-varying signal derived from the sampled rectified voltage, a comparator circuit for comparing the sampled rectified voltage and the time-varying signal, and a counter circuit for providing the discharge signal in response to an output of the comparator circuit.

18 Claims, 10 Drawing Sheets

CAPACITOR DISCHARGE CIRCUIT FOR POWER SUPPLY EMI FILTERS

CROSS-REFERENCES TO RELATED APPLICATIONS

This application claims priority to Chinese Patent Application No. 201410421183.4, filed on Aug. 25, 2014 and Chinese Patent Application No. 201420481112.9, filed on Aug. 25, 2014, both of which are incorporated herein by reference in their entirety.

BACKGROUND OF THE INVENTION

The present invention relates generally to the field of switch mode power supply (SMPS). More particularly, embodiments of the present invention relate to circuits for discharging input capacitors in SMPS.

Switched-mode AC-DC converters are widely used to provide stable power to home appliances, computers, communicating devices and so on. Switch mode power supplies have many advantages, including smaller volume, better stability, and higher power efficiency. As SMPS finds wide spread applications in portable consumer electronics, more emphasis has been placed on performance issues such as electromagnetic interference (EMI) protection and standby power. For EMI protection, the input port of the converters often has a capacitor connected directly across the two AC lines (X-capacitor) for suppressing noise generated. In conventional power supplies, a discharging resistor is often disposed parallel to the X-capacitors for discharging the capacitor and avoiding the user getting electric shock when the device is unplugged from the power outlet.

Figure 1:
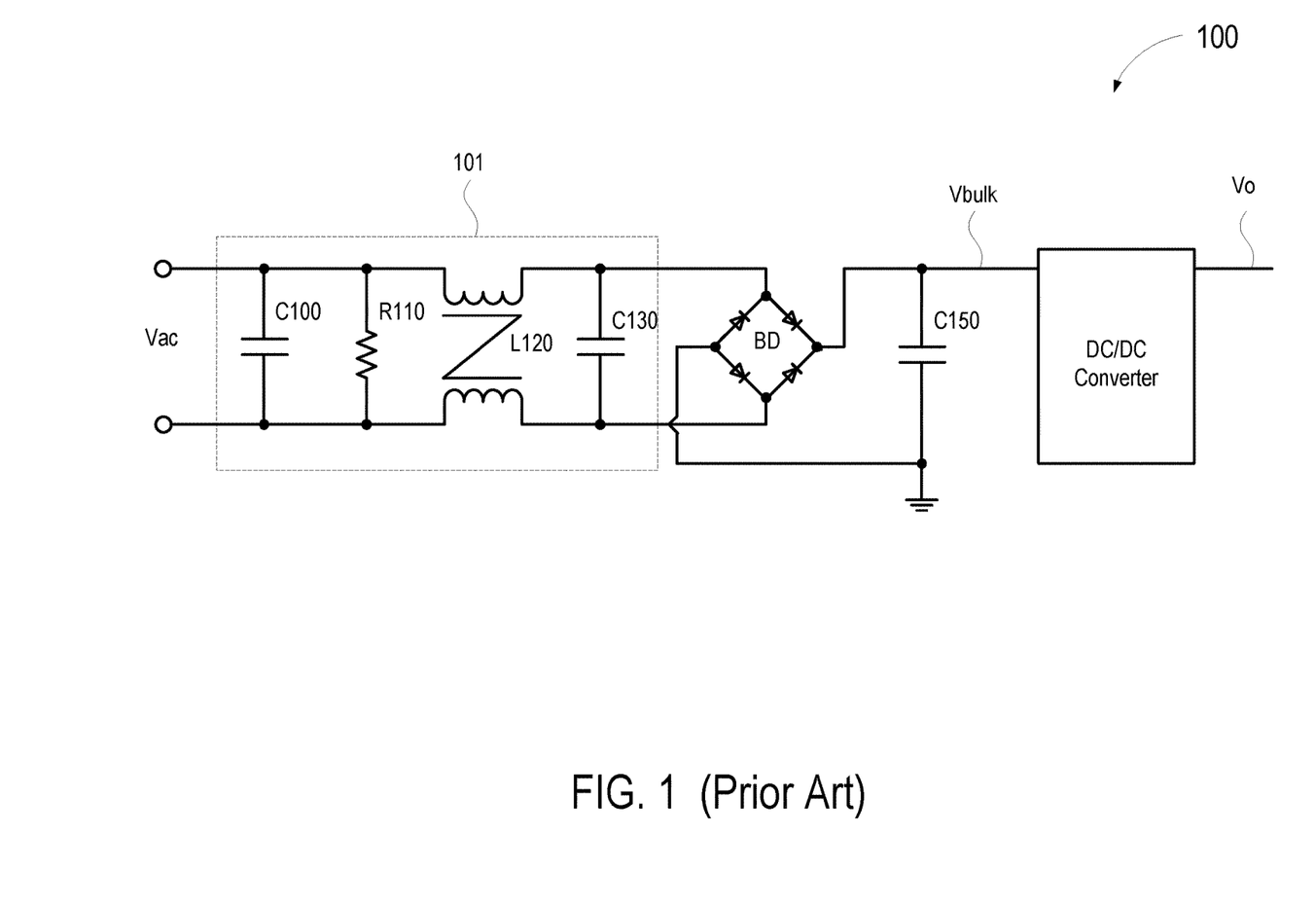
FIG. 1 is a simplified schematic diagram illustrating a conventional power converter.

FIG. 1 is a simplified schematic diagram illustrating a conventional power converter. As shown in FIG. 1, converter 100 includes an input filter 101, a bridge diode BD, a capacitor C150, and a DC-DC converter. Input filter 101 includes a first X-capacitor C100, a second X-capacitor C130, a discharging resistor R110, and an inductor L120. Input filter 101 is configured to stabilize the AC power source Vac, and to reduce electromagnetic interference (EMI). The bridge diode BD includes two input terminals and two output terminals and four diodes. The two input terminals of bridge diode BD are connected to two output terminals of the inductor L1. The two output terminals of the bridge diode BD are connected to two terminals of capacitor 150. Bridge diode BD rectifies the AC power source, and capacitor 150 is used to smooth the output from the rectifier to generate a DC voltage Vbulk to the DC-DC converter. The DC-DC converter is configured to convert voltage Vbulk into a regulated DC voltage Vo.

In input filter 101, two terminals of the first X-capacitor C100 and two terminals of discharge resistor R110 are connected to two terminals of the AC power source Vac, respectively. Two input terminals of inductor L120 (also referred to as a choke coil) are connected to two terminals of the AC power source Vac, and two output terminals of the inductor L120 are connected to two terminals of the second X-capacitor C2. When the power supply is in operation, capacitors C100 and C130 are charged by Vac, and input filter 101 stabilizes the AC power source Vac and reduces electromagnetic interference (EMI). When supply of the AC source Vac stops, for example, after a power supply is unplugged from the power outlet, it is necessary to discharge of the two capacitors. As shown in FIG. 1, conventional power supply 100 has the discharging resistor R110 to discharge capacitors C100 and C130. However, since the discharge resistor R110 continues to consume power when the AC power source Vac is on, it reduces efficiency of the power system and causes large standby power. Under no load condition, this standby power can constitute a substantial portion of the power consumption of the power supply.

Various methods have been proposed to reduce this power loss by introducing a detection circuit to determine whether the AC power source has stopped and only use the discharge resistor to discharge the X-capacitors when the AC power source is stopped. For example, a conventional detection circuit compares a sampled AC voltage with a predetermined constant reference voltage. An alternative conventional detection circuit uses a reference voltage that is a fixed fraction of a peak voltage of the sampled AC voltage.

BRIEF SUMMARY OF THE INVENTION

The inventors have observed that the conventional methods described above for reducing power loss from the discharging resistor suffer from many limitations. The conventional methods include detecting the AC input voltage using a constant reference voltage that is either a predetermined constant reference voltage or a fixed fraction of the peak of sampled AC voltage. However, the AC input voltage or rectified AC voltage can drift over time. Therefore, comparing to a constant or fixed reference may not provide an accurate measure of the state of the input AC voltage. Thus, the performance of the power supply can be susceptible to the instability of the line voltage. Moreover, the conventional designs often involve complicated circuits that cause the power supply less cost-effective. Further, it is often challenging for conventional designs to meet more stringent requirements. For example, in some applications, power supplies rated at more than 20 Watts are required to have a standby power of less than 20 mW. Further, in power supplies with X-capacitors are sometimes required to discharge the X-capacitors within a certain amount of time.

According to embodiments of the present invention, a discharging circuit is configured to discharge the X-capacitors in a controlled manner when the AC input voltage is stopped. The presence of the AC input voltage is detected by comparing a sampled rectified AC input voltage with a time-varying signal derived from a signal-shaping circuit. The AC voltage sensing circuit in embodiments of the invention provides margins to small changes or ripples either at high or low voltages of the rectified input signal Vb. As a result, the AC voltage sensing circuit in embodiments of the invention are less susceptible to noise or instability in the input AC voltage compared with conventional designs.

According to an embodiment of the present invention, a discharging circuit for an input filter capacitor of a power supply includes a rectifying circuit for coupling to the input filter capacitor that is coupled to an AC input voltage. The rectifying circuit is configured to provide a rectified AC voltage from the AC input voltage. The discharging circuit also includes a discharge resistor coupled to the rectifying circuit, and a power switch and a discharging current source coupled in series with the discharging resistor. A discharge control circuit is coupled to the discharge resistor and is configured to provide a discharge signal to cause the power switch to turn on for discharging the capacitor using the discharging current source. The discharging control circuit includes an AC voltage sensing circuit coupled to the discharging resistor and configured to provide a time-varying signal derived from a sampled rectified AC voltage, and configured to compare the sampled rectified AC voltage with the time-varying signal. The discharging control circuit also includes a counter circuit configured to provide the discharge signal to the power switch in response to an output of the AC voltage sensing circuit.

In an embodiment of the above discharging circuit, the time-varying signal is characterized by the same frequency as the sampled rectified AC voltage. The time-varying signal has a first flat portion that is configured to intersect a falling portion of the sampled rectified AC voltage and a second flat portion that is configured to intersect a rising portion of the sampled rectified AC voltage.

In an embodiment of the above discharging circuit, the AC voltage sensing circuit includes a voltage divider having a first resistor and a second resistor and a sensing node between the first and the second resistors for providing the sampled rectified AC voltage. The AC voltage sensing circuit also has a comparator having a first input and a second input with the first input coupled to the sensing node. A bidirectional diode device has a first terminal coupled to the sensing node and a second terminal coupled to the second input terminal of the comparator. The bidirectional diode device has a first diode device and a second diode device, wherein the first terminal of the bidirectional device is coupled to an anode of the first diode device and a cathode of the second diode device, and the second terminal of the bidirectional device is coupled to a cathode of the first diode device and an anode of the second diode device. The AC voltage sensing circuit also has a capacitor having a first terminal coupled to the bidirectional diode device and a second terminal coupled between the second input of the comparator and ground.

In another embodiment, the AC voltage sensing circuit also has an edge detection circuit coupled to the comparator to produce a pulse signal at a rising and a falling edge of the output of the comparator. In an embodiment, the edge detection circuit is coupled to the counter circuit, and the pulse signal is configured to reset the counter circuit.

In an embodiment, the bidirectional diode device comprises two junction diodes. In another embodiment, the bidirectional diode device comprises two MOS transistors. In yet another embodiment, the bidirectional diode device comprises two bipolar transistors. In another embodiment, the bidirectional diode device comprises two amplifiers having hysteresis.

According to another embodiment of the present invention, a discharging circuit for an input filter capacitor of a power supply includes a rectifying circuit for coupling to the input filter capacitor that is coupled to an AC input voltage. The rectifying circuit is configured to provide a rectified AC voltage from the AC input voltage. The discharging circuit also includes a discharge resistor coupled to the rectifying circuit, and a power switch and a discharging current source coupled in series with the discharging resistor. The discharging circuit also has a discharge control circuit coupled to the discharge resistor and configured to provide a discharge signal to cause the power switch to turn on for discharging the capacitor using the discharging current source. The discharging control circuit includes an AC voltage sampling circuit for providing a sampled rectified AC voltage from the AC input voltage, a signal-shaping circuit for providing a time-varying signal derived from the sampled rectified AC voltage, a comparator circuit for comparing the sampled rectified AC voltage and the time-varying signal, and a counter circuit configured to provide the discharge signal in response to an output of the comparator circuit.

In an embodiment of the above discharging circuit, the time-varying signal is characterized by the same frequency as the sampled rectified AC voltage. The time-varying signal includes a first flat portion that crosses over with a falling portion of the sampled rectified AC voltage and a second flat portion that crosses over with a rising portion of the sampled rectified AC voltage.

In another embodiment of the above discharging circuit, the signal-shaping circuit includes a bidirectional diode device and a capacitor. The bidirectional diode device has a first diode device and a second diode device between a first terminal and a second terminal. The first terminal of the bidirectional device is coupled to an anode of the first diode device and a cathode of the second diode device, and the second terminal of the bidirectional device is coupled to a cathode of the first diode device and an anode of the second diode device. A first terminal of the capacitor is coupled between the bidirectional diode device and an input terminal of the comparator, and a second terminal of the capacitor is coupled to ground.

According to another embodiment of the present invention, a switch mode power supply includes an input filter coupled to an AC input voltage, the input filter including at least one capacitor. The switch mode power supply also has a discharging circuit coupled to the input filter. The discharging circuit is configured to discharge the capacitor through a discharging current source and a discharging resistor in response to a discharging signal. The discharging circuit includes an AC voltage sampling circuit for providing a sampled rectified AC voltage from the AC input voltage, a signal-shaping circuit for providing a time-varying signal derived from the sampled rectified AC voltage, a comparator circuit for comparing the sampled rectified AC voltage and the time-varying signal, and a counter circuit configured to provide the discharge signal in response to an output of the comparator circuit.

A further understanding of the nature and advantages of the present invention may be realized by reference to the remaining portions of the specification and the drawings.

DETAILED DESCRIPTION OF THE INVENTION

Figure 2:
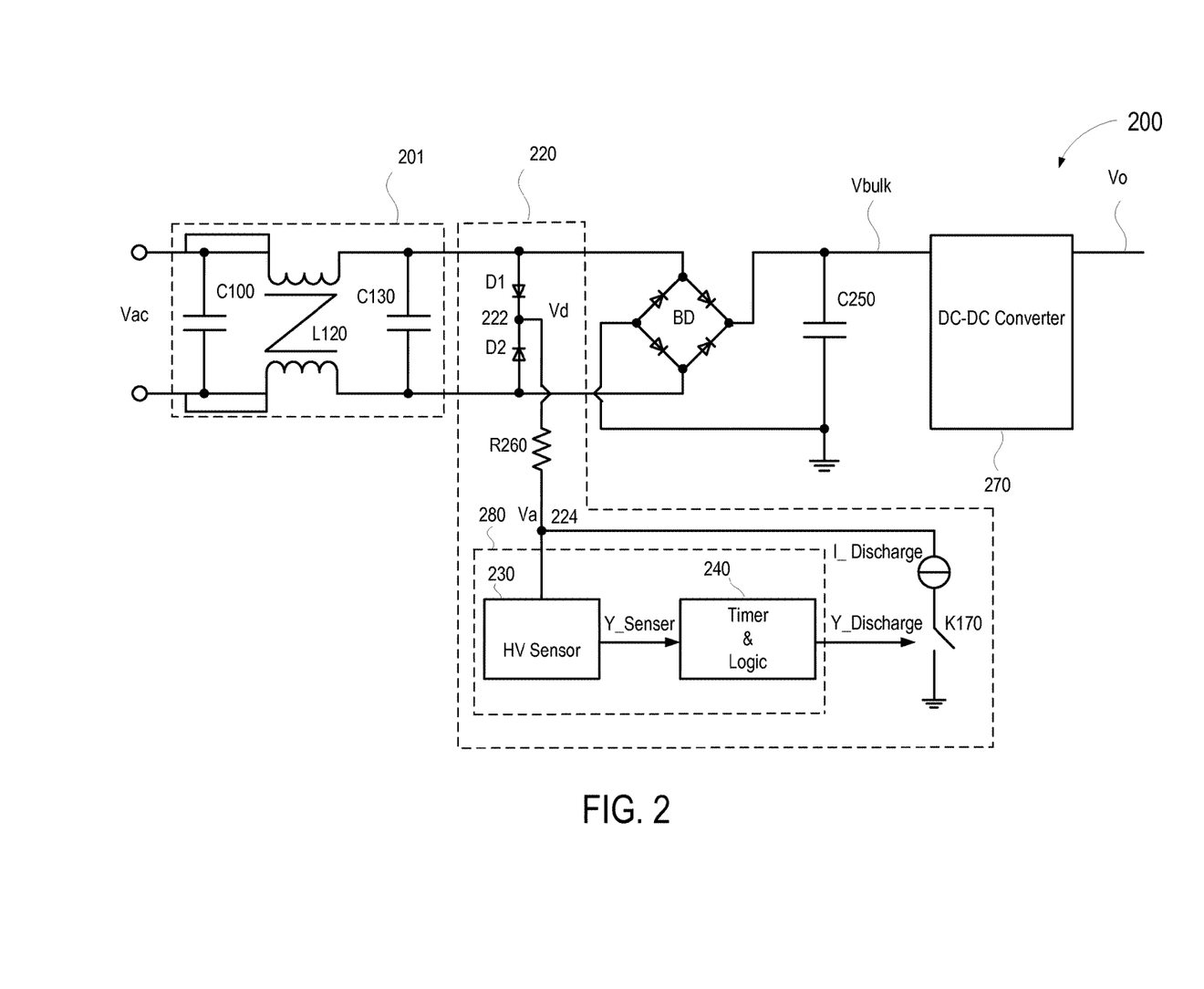
FIG. 2 is a simplified schematic diagram illustrating an AC-DC power supply system according to an embodiment of the present invention.

FIG. 2 is a simplified schematic diagram illustrating an AC-DC power supply system according to an embodiment of the present invention. As shown in FIG. 2, power supply system 200 includes an input filter 201, a bridge diodes BD, an input capacitor C250, an DC-DC converter 270. Depending on the embodiments, converter 270 can be any suitable power converters, including PFM (pulse frequency modulation) or PWM (pulse width modulation) converters. Input filter 201 is similar to input filter 101 shown in FIG. 1 for reducing EMI, and includes a first X-capacitor C100, a second X-capacitor C130, and an inductor L120. However, discharging resistor R110 in FIG. 1 is replaced by a discharging circuit 220 in FIG. 2 that is configured to detect AC line voltage in real time and to discharge current from the X-capacitor within a given time when the input AC power is stopped. This condition can arise, for example, when a power supply is unplugged from the power outlet. The discharging circuit can significantly lower power loss in the EMI filter stage by eliminating the X-capacitor discharge resistors.

Discharging circuit 220 in FIG. 2 includes two diodes D1 and D2 forming a full-wave rectifying circuit with two of the four bridge diodes BD. The rectifying circuit provides a rectified voltage Vd at a node 222 between diodes D1 and D2. A current-limiting resistor R260 is coupled to Vd. A discharge control circuit 280 is coupled to resistor R160 at a node 224 at a voltage labeled Va. The discharging circuit is configured to discharge the X-capacitors in a controlled manner when the AC input voltage is stopped. The presence of the AC input voltage is detected by comparing a sampled rectified AC input voltage with a time-varying signal derived from a signal-shaping circuit, as described below.

In the embodiment shown in FIG. 2, discharge control circuit 280 includes a high-voltage (HV) sensor 230, a timer circuit 240, a power switch K170, and a constant current source labeled as I_discharge. HV sensor 230 is coupled to node 224 to receive rectified voltage Va and is configured to determine if the input port is supplying AC power. Time circuit 240 is configured to provide a delay time before issuing the discharge signal.

Figure 3A:
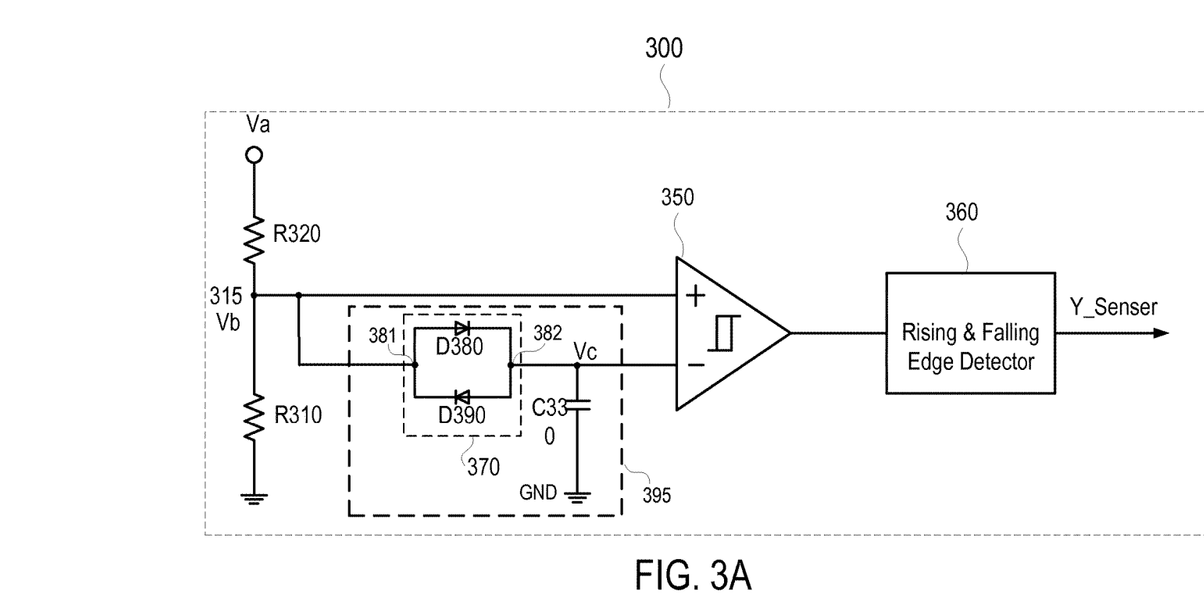
FIG. 3A is a simplified schematic diagram illustrating an AC voltage sensing circuit according to an embodiment of the present invention.

FIG. 3A is a simplified schematic diagram illustrating an AC voltage sensing circuit according to an embodiment of the present invention. AC voltage sensing circuit 300 is an example of circuit that can be used as HV sensor 230 in FIG. 2. As shown in FIG. 3A, AC voltage sensing circuit 300 includes a voltage divider having a first resistor R310 and a second resistor R320. A sensing node 315 between the first and the second resistors provides a sampled rectified AC voltage Vb. In some embodiments, the ratio of R310 and R320 is selected in order to facilitate low-voltage circuit implementation, for example, to maintain Vb at 5 volts or low. Moreover, the resistances of R310 and R320 are selected to reduced power consumption in the sensing circuit. Merely as an example, in some embodiments, Vac can have a magnitude of hundreds of volts, R310 can be hundreds of KΩ, and R320 can be more than 100 MΩ. In particular, the large resistance of R320 serves to limit power consumption.

AC voltage sensing circuit 300 also includes a comparator 350 having a first (positive) input and a second (negative) input, with the first input coupled to sensing node 315. A bidirectional diode device 370 has a first terminal 381 coupled to sensing node 315 and a second terminal 382 coupled to the second (negative) input terminal of the comparator. As shown in FIG. 3A, bidirectional diode device 370 has a first diode device 380 and a second diode device 390. The first terminal 381 of the bidirectional device is coupled to an anode of the first diode device 380 and a cathode of the second diode device 390, and the second terminal 382 of the bidirectional device is coupled to a cathode of the first diode device 380 and an anode of the second diode device 390. AC voltage sensing circuit 300 also has a capacitor C330 coupled to terminal 382 of bidirectional diode device 370. Capacitor C330 is also coupled between the second (negative) input terminal of the comparator and ground GND. The voltage at the second (negative) input terminal of the comparator is designated as Vc. In some embodiments, comparator 350 is a comparator with hysteresis to increase error margin. In the embodiment of FIG. 3A, AC voltage sensing circuit 300 also includes an edge detection circuit 360 coupled to comparator 350 to produce a pulse signal Y_senser at a rising and a falling edge of the output of the comparator. As shown in FIG. 3A, bidirectional diode device 370 and capacitor 330 combine to form a signal-shaping circuit 395.

Figure 3B:
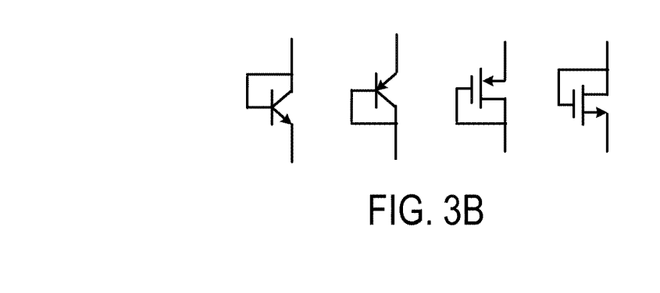
FIG. 3B is a simplified schematic diagram illustrating alternative bidirectional diode devices that can be used in the AC voltage sensing circuit of FIG. 3A according to an embodiments of the present invention.

In FIG. 3A, diodes D380 and D390 in bidirectional diode device 370 are shown as semiconductor junction diodes. In alternative embodiments, as shown in FIG. 3B, each of the diodes in bidirectional diode device 370 can be a diode-connected NPN or PNP bipolar transistor or a diode-connected NMOS or PMOS transistor.

Figure 4:
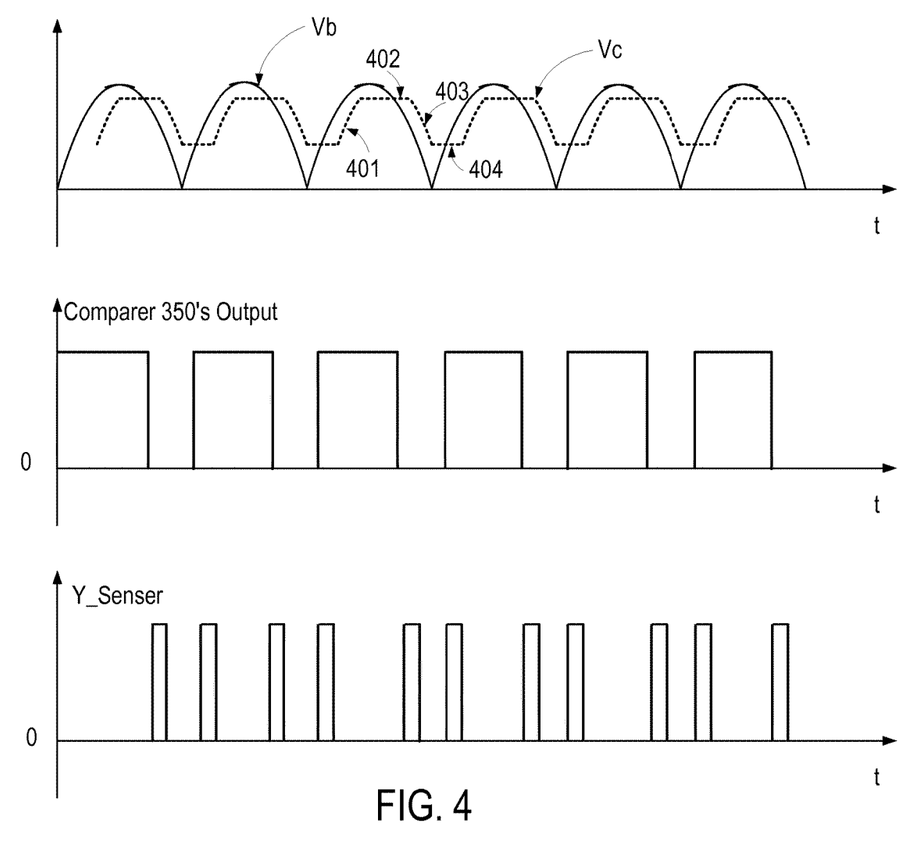
FIG. 4 is a waveform diagram illustrating waveforms at various nodes in AC voltage sensing circuit 300 of FIG. 3A according to an embodiment of the present invention.

FIG. 4 is a waveform diagram illustrating waveforms at various nodes in AC voltage sensing circuit 300 of FIG. 3A. As shown in FIG. 4, Vb at node 315 in FIG. 3A that feeds to the positive input of comparator 350 is a sampled full wave rectified AC input voltage. Voltage Vc is a time-varying signal derived by signal-shaping circuit 395 from the sampled rectified AC voltage Vb. As shown in FIG. 4, time-varying signal Vc includes a rising portion 401, a falling portion 403, and two substantial flat portions 402 and 404. Rising portion 401 and falling portion 403 follow voltage Vb, and the voltage difference between Vb and Vc is caused by the forward voltage drop of the bidirectional diodes D380 and D390. In FIG. 4, the flat portions of Vc, 402 and 404, are caused by voltage holding of capacitor C330 while Vb changes magnitude. When the voltage level of Vb is larger than that of Vc, the output of comparator 350 is high. In the rising portion 401 of Vc, the slope of full-wave Vb is positive. When the voltage level of Vb is lower than that of Vc, the output of comparator 350 is low. In the falling portion 403 of Vc, the slope of full-wave Vb is negative. If the voltage level of Vb crosses that of Vc in the flat portions 402 and 404, the output of comparator 350 output signal makes a transition from high to low or from low to high. The transitions of the comparator 350's output signal is used as an indication that an AC input voltage continues to be present. In some embodiments, edge detection circuit 360 is coupled to comparator 350 to produce a pulse signal Y_senser at a rising and a falling edge of the output of the comparator. The presence of the pulse signal is used as an indication that an AC input voltage continues to be present.

Figure 5:
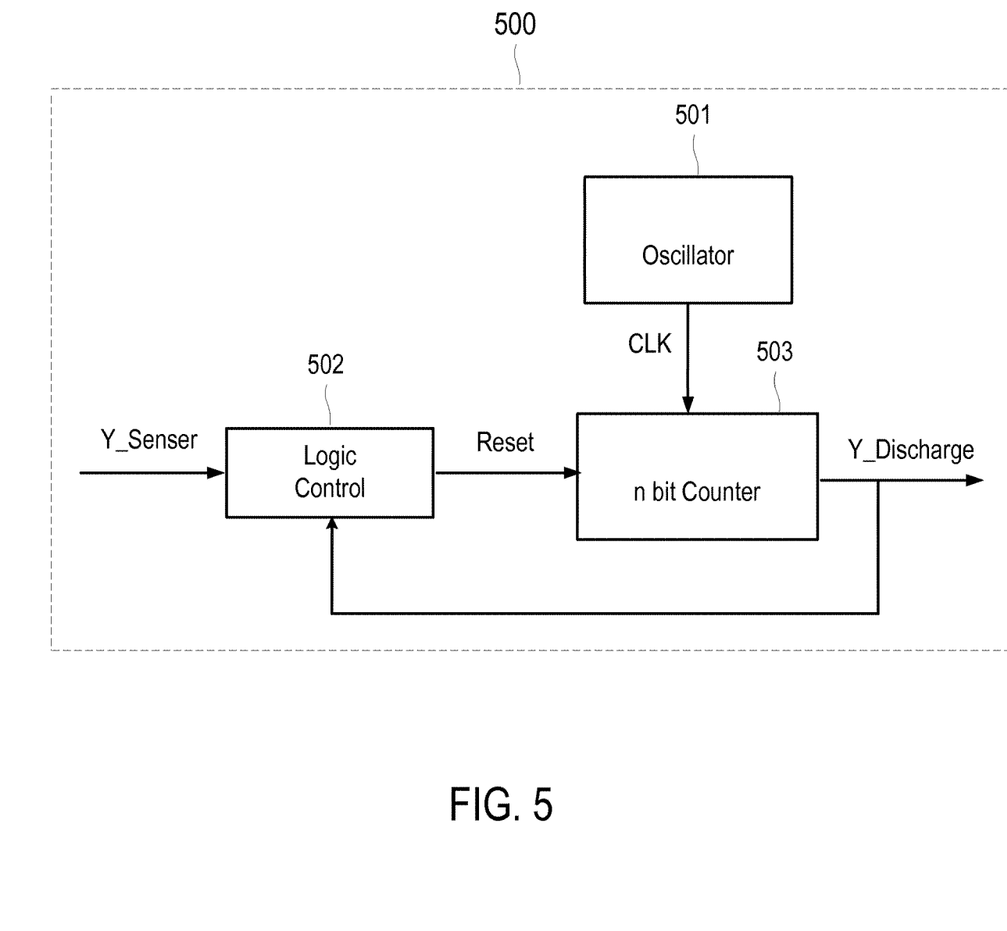
FIG. 5 is a simplified schematic diagram illustrating a timer circuit according to an embodiment of the present invention.

FIG. 5 is a simplified schematic diagram illustrating a timer circuit according to an embodiment of the present invention. Timer circuit 500 in FIG. 5 is an example of timer circuit 240 in FIG. 2. As shown in FIG. 5, timer circuit 500 includes an oscillator 501, a logic control 502, and an n-bit counter circuit 503. Oscillator 501 is configured to produce a pulse signal named CLK, which serves as a base clock signal for counter circuit 503. Counter circuit 503 is configured to increment unless receiving a reset signal, and when the n-bit counter elapses, counter circuit 503 issues an output signal labeled Y_Discharge. In other words, the discharge signal is triggered by the absence of the reset signal for a duration of the elapsed time of the n-bit counter.

Figure 6:
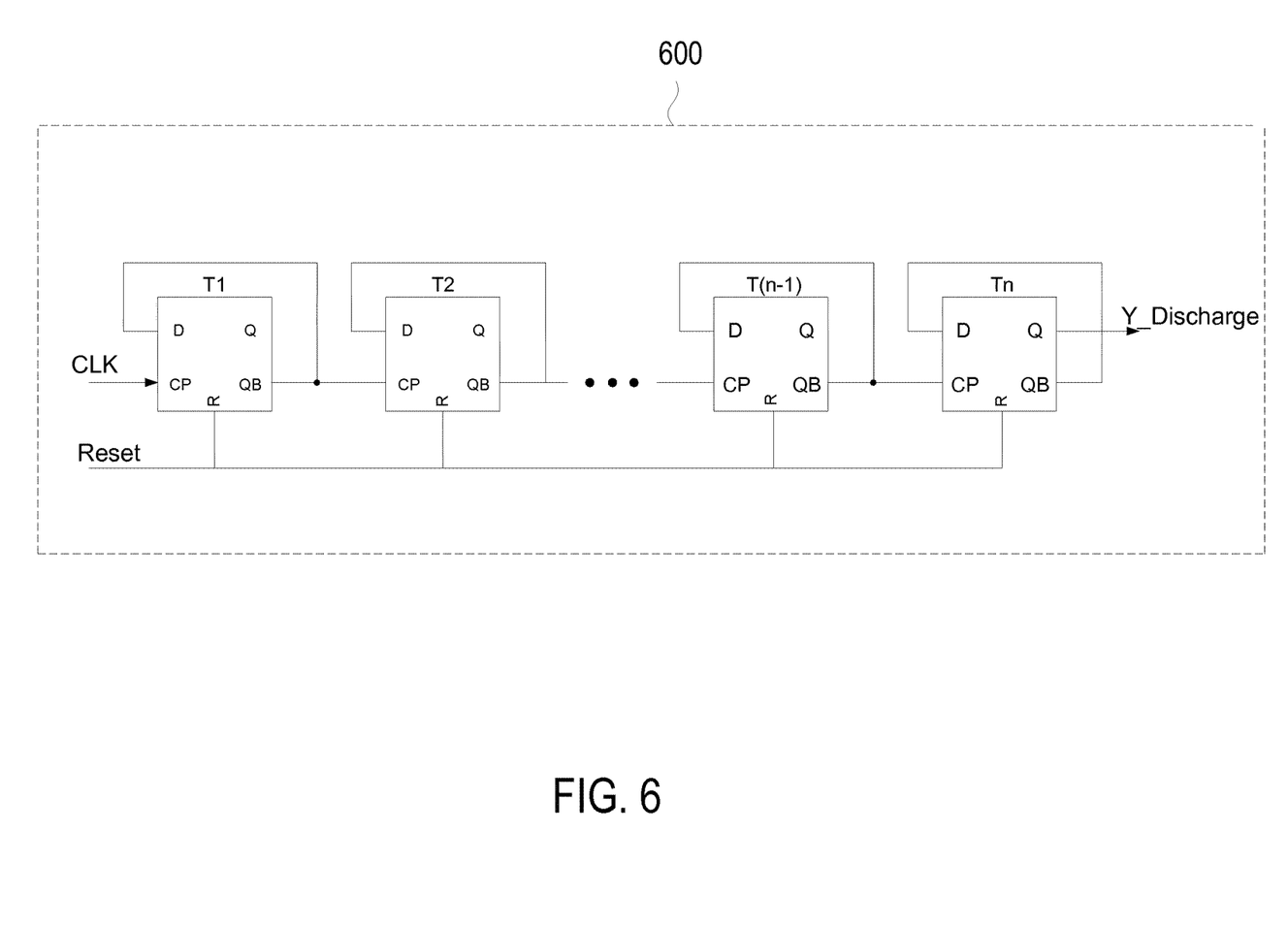
FIG. 6 is a simplified schematic diagram illustrating a counter circuit according to an embodiment of the present invention.

FIG. 6 is a simplified schematic diagram illustrating a counter circuit according to an embodiment of the present invention. Counter circuit 600 in FIG. 6 is an example of n-bit counter circuit 503 in FIG. 5. In alternative embodiments, other suitable counter circuit can also be used. As shown in FIG. 6, counter circuit 600 includes a plurality of D-flip flops labeled T1, T2, . . . Tn coupled in series. An input clock signal CLK is coupled to flip flop T1. A Reset signal is coupled to each flip flops. The output of counter circuit is Y-Discharge.

As shown in FIG. 5, logic control circuit 502 receives signal Y_senser from HV sensor 300 in FIG. 3A, and provide a Reset signal. As explained above, pulse signal Y_senser confirms the AC input voltage is being received. In other words, counter circuit 503 is reset repeatedly as long as the AC input voltage is present. If no reset pulse signal is received by the n-bit counter, the counter continues to count as the cp signal is propagated down the chain of flip flops. When the nth flip flop is reached, the n-bit counter elapses, and that is an indication that the AC input voltage has stopped for the duration of the elapse time of the n-bit counter. When the n-bit counter elapses, the Y_Discharge turns on power switch K170, and causes capacitors C100 and C130 to discharge through current source I_source.

Figure 7A:
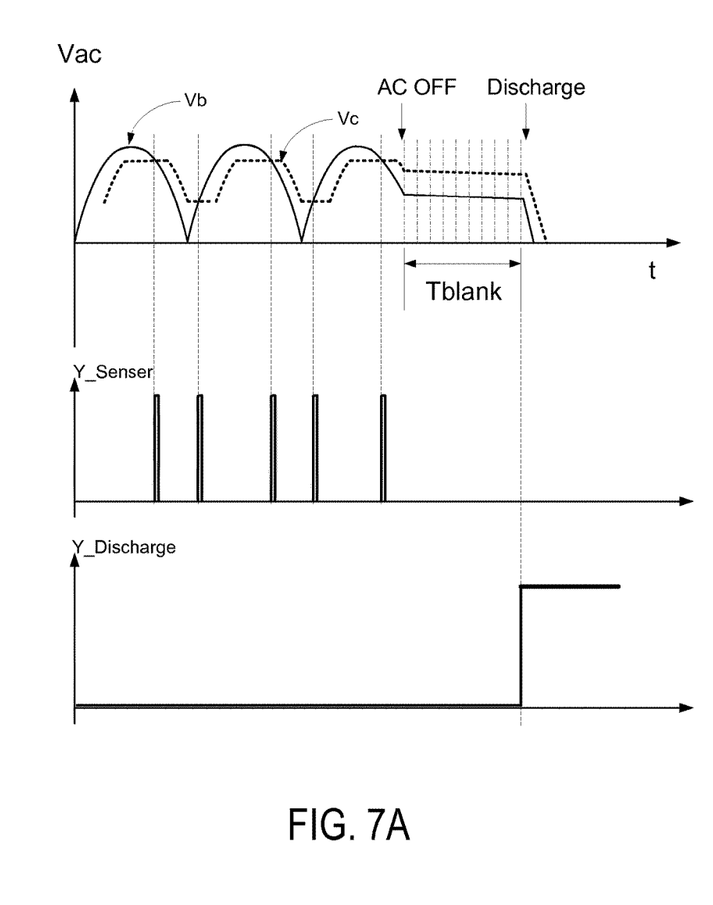
FIGS. 7A and 7B are waveform diagrams illustrating the operation of AC voltage sensing circuit 300 in FIG. 3.
Figure 7B:
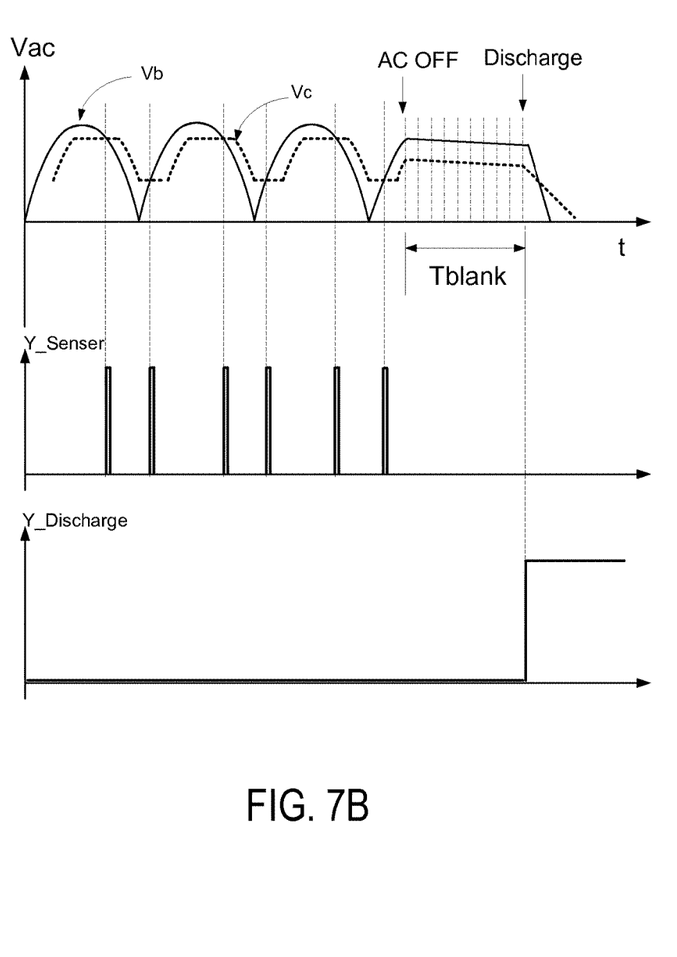

FIGS. 7A and 7B are waveform diagrams illustrating the operation of AC voltage sensing circuit 300 in FIG. 3. As described above in connection with FIG. 4, Vb is the sampled full wave rectified AC input voltage, and voltage Vc is a time-varying signal derived from the sampled rectified AC voltage Vb. In FIG. 7A, when Vb and Vc cross over each other, a pulse signal Y_senser is produced, indicating the present of the AC input voltage. When the AC input voltage is stopped, pulse signal Y_senser is no longer available to reset the counter. At this point, Vb is lower than Vc when the AC input voltage is stopped, and the X-capacitors in the EMS filter hold the input AC voltage substantially constant. The n-bit counter propagates through each stage with each clock signal CLK, as shown by the dashed vertical lines during the period Tblank in FIG. 7A. After the time period Tblank, the counter elapses and the Y_discharge signal is provided. The Y_discharge signals turns on power switch K170, and causes capacitors C100 and C130 to discharge through current source I_source. As a result, both Vb and Vc start to drop. The example illustrated in FIG. 7B is similar to that in FIG. 7A, except that Vb is higher than Vc when the AC input voltage is stopped. In embodiments of the invention, the time period Tblank can be select with the frequency of clock signal CLK and the number of stages n in the n-bit counter, (Tblank=n*Tosc, where Tosc is the period of clock signal CLK). For example, in some embodiments, Tblank can be set to 50 to 60 milliseconds.

As described above, in embodiments of the invention, the AC voltage sensing circuit is configured to provide a time-varying signal derived from the sampled rectified AC voltage, and the AC voltage sensing circuit is also configured to compare the sampled rectified AC voltage with the time-varying signal to determine the presence of the AC input voltage. In the example of FIG. 3 illustrated above, the time-varying signal is derived using a signal-shaping circuit that includes a bidirectional diode device and a capacitor. As depicted in FIG. 4, the cross-over points between Vb and Vc occur in the two flat portions 402 and 404 of the time-varying signal Vc. The two flat portions of Vc are offset from the peak and valley of Vb due to the voltage drops in the bidirectional diode device. Therefore, the AC voltage sensing circuit in embodiments of the invention provides margins to small changes or ripples at either high or low voltages of the rectified input signal Vb. As a result, the AC voltage sensing circuit in embodiments of the invention are less susceptible to noise or instability in the input AC voltage compared with conventional methods, which uses a predetermined reference voltage or a constant reference voltage that is a fraction of the peak AC voltage.

Figure 8:
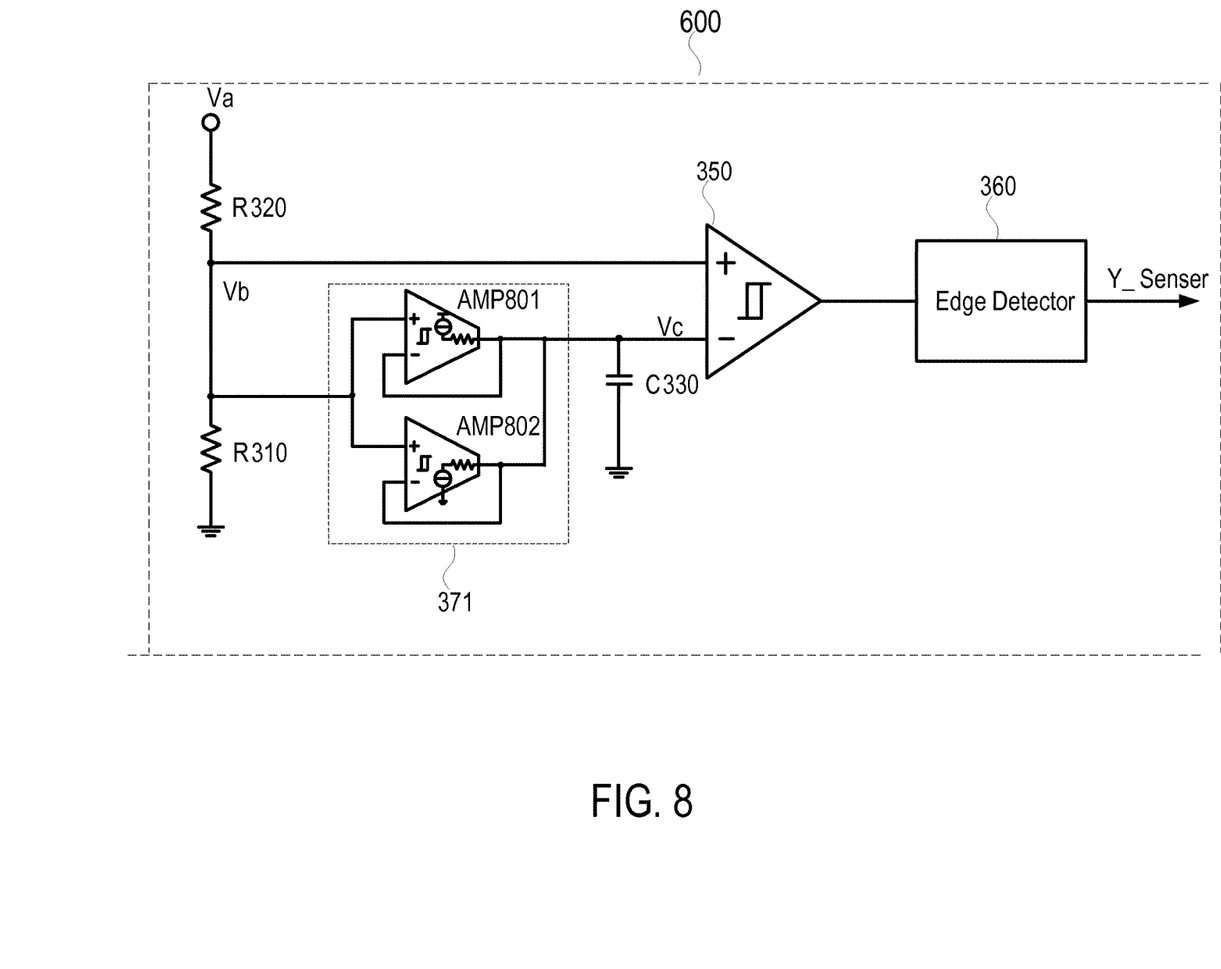
FIG. 8 is a simplified schematic diagram illustrating an AC voltage sensing circuit 800 according to another embodiment of the present invention.

FIG. 8 is a simplified schematic diagram illustrating an AC voltage sensing circuit 800 according to another embodiment of the present invention. AC voltage sensing circuit 800 is similar to AC voltage sensing circuit 300 in FIG. 3A, except that the bidirectional diode device 370 in FIG. 3 is replaced by two amplifiers with hysteresis 371 including AMP801 and AMP802. Amplifier AMP801 only has sourcing output capacity, while amplifier AMP802 only has sinking output capacity.

Figures 9A, 9B:
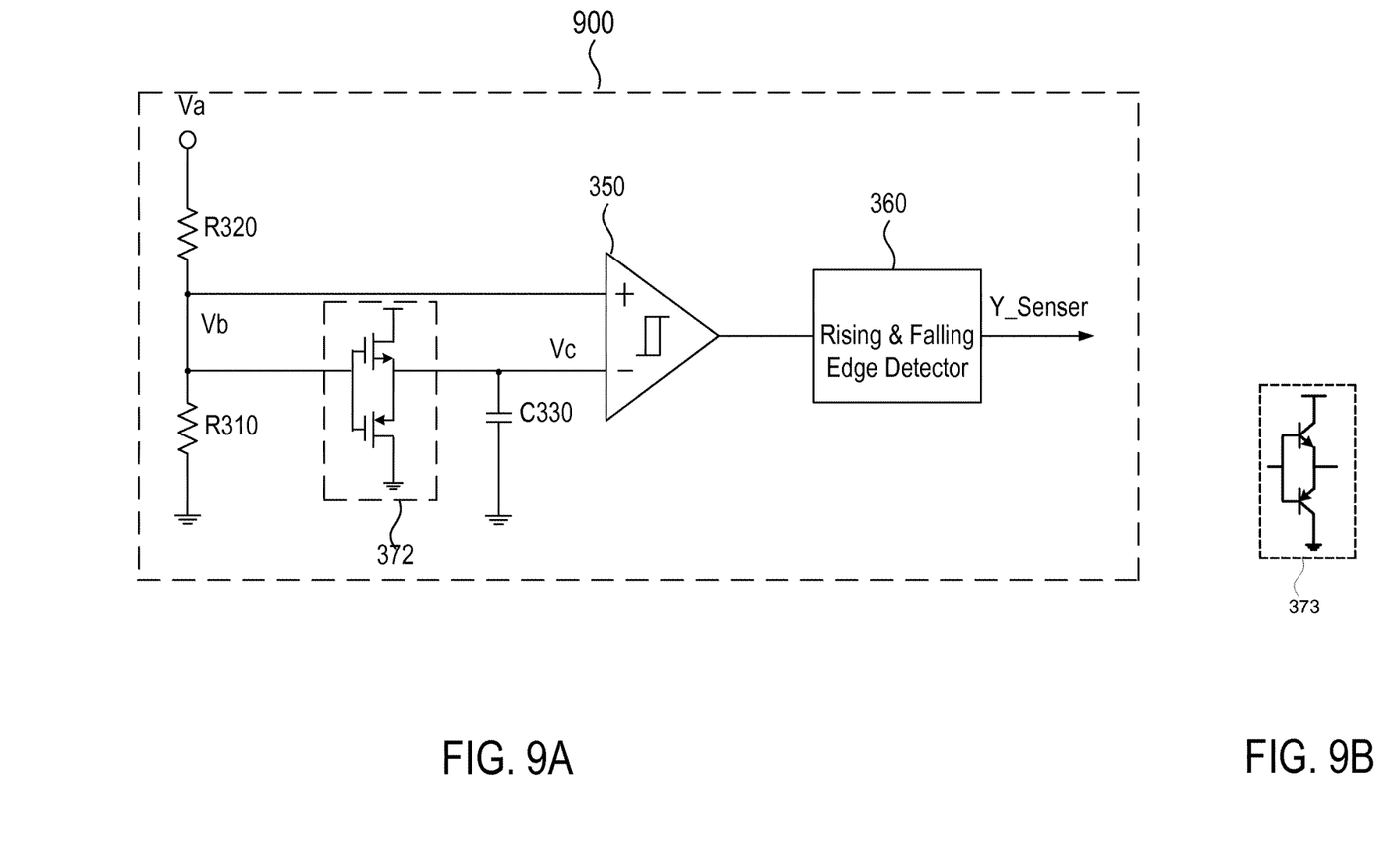
FIG. 9A is a simplified schematic diagram illustrating an AC voltage sensing circuit according to yet another embodiment of the present invention.
FIG. 9B shows a bidirectional diode device that includes two bipolar transistors according to an embodiment of the present invention.

FIG. 9A is a simplified schematic diagram illustrating an AC voltage sensing circuit 900 according to yet another embodiment of the present invention. As shown, AC voltage sensing circuit 900 is similar to AC voltage sensing circuit 300 in FIG. 3A, except that the bidirectional diode device 370 in FIG. 3 is replaced by two MOS transistors including an NMOS transistor and a PMOS transistor.

FIG. 9B shows a bidirectional diode device 373 that includes two bipolar transistors, including an NPN transistor and a PNP transistor.

Various embodiments of the present invention are described above. It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A discharging circuit for an input filter capacitor of a power supply, the discharging circuit comprising:
   a rectifying circuit for coupling to the input filter capacitor that is coupled to an AC input voltage, the rectifying circuit configured to provide a rectified AC voltage from the AC input voltage;
   a discharge resistor coupled to the rectifying circuit; for receiving the rectified AC voltage;
   a power switch and a discharging constant current source coupled in series with the discharging resistor; and
   a discharge control circuit coupled to a node between the discharge resistor and the constant current source and configured to provide a discharge signal to cause the power switch to turn on for discharging the capacitor using the discharging current source;
   wherein the discharging control circuit includes:
   an AC voltage sensing circuit coupled to the discharging resistor and configured to provide a time-varying signal derived from a sampled rectified AC voltage, the AC voltage sensing circuit being configured to compare the sampled rectified AC voltage with the time-varying signal; and a counter circuit configured to provide the discharge signal to the power switch in response to an output of the AC voltage sensing circuit.

2. The circuit of claim 1, wherein the time-varying signal is characterized by the same frequency as the sampled rectified AC voltage, and the time-varying signal having a first flat portion that is configured to intersect a falling portion of the sampled rectified AC voltage and a second flat portion that is configured to intersect a rising portion of the sampled rectified AC voltage.

3. The circuit of claim 1, wherein the AC voltage sensing circuit comprises:
  a voltage divider having a first resistor and a second resistor and a sensing node between the first and the second resistors for providing the sampled rectified AC voltage;
  a comparator having a first input and a second input, the first input coupled to the sensing node;
  a bidirectional diode device having a first terminal coupled to the sensing node and a second terminal coupled to the second input of the comparator, the bidirectional diode device having a first diode device and a second diode device, wherein the first terminal of the bidirectional device is coupled to an anode of the first diode device and a cathode of the second diode device, and the second terminal of the bidirectional device is coupled to a cathode of the first diode device and an anode of the second diode device; and
  a capacitor having a first terminal coupled to the bidirectional diode device and a second terminal coupled between the second input of the comparator and ground.

4. The circuit of claim 3, further comprising an edge detection circuit coupled to the comparator to provide a pulse signal at a rising and a falling edge of the output of the comparator.

5. The circuit of claim 4, wherein the edge detection circuit is coupled to the counter circuit, and the pulse signal from the edge detection circuit is configured to reset the counter circuit.

6. The circuit of claim 3, wherein the bidirectional diode device comprises two junction diodes.

7. The circuit of claim 3, wherein the bidirectional diode device comprises two MOS transistors.

8. The circuit of claim 3, wherein the bidirectional diode device comprises two bipolar transistors.

9. The circuit of claim 3, wherein the bidirectional diode device comprises two amplifiers each having hysteresis.

10. The circuit of claim 1, wherein the rectifying circuit comprises two diodes.

11. A discharging circuit for an input filter capacitor of a power supply, the discharging circuit comprising:
  a rectifying circuit for coupling to the input filter capacitor that is coupled to an AC input voltage, the rectifying circuit configured to provide a rectified AC voltage from the AC input voltage;
  a discharge resistor coupled to the rectifying circuit; for receiving the rectified AC voltage;
  a power switch coupled in series with the discharging resistor; and
  a discharge control circuit coupled to the discharge resistor and configured to provide a discharge signal to cause the power switch to turn on for discharging the capacitor;

wherein the discharging control circuit includes:
  an AC voltage sampling circuit for providing a sampled rectified AC voltage from the AC input voltage;
  a signal-shaping circuit for providing a time-varying signal derived from the sampled rectified AC voltage;
  a comparator circuit for comparing the sampled rectified AC voltage and the time-varying signal;
  a counter circuit configured to provide the discharge signal in response to an output of the comparator circuit;
wherein the signal-shaping circuit comprises:
  a bidirectional diode device having a first terminal coupled to AC voltage sampling circuit and a second terminal coupled to an input terminal of the comparator, the bidirectional diode device having a first diode device and a second diode device between the first and the second terminals, wherein the first terminal of the bidirectional device is coupled to an anode of the first diode device and a cathode of the second diode device, and the second terminal of the bidirectional device is coupled to a cathode of the first diode device and an anode of the second diode device; and
  a capacitor having a first terminal coupled to the bidirectional diode device and a second terminal coupled between the input terminal of the comparator and a ground terminal.

12. The discharging circuit of claim 11, wherein the time-varying signal is characterized by the same frequency as the sampled rectified AC voltage, and the time-varying signal having a first flat portion that is configured to intersect a falling portion of the sampled rectified AC voltage and a second flat portion that is configured to intersect a rising portion of the sampled rectified AC voltage.

13. The discharging circuit of claim 11, further comprising an edge detection circuit coupled to the comparator to produce a pulse signal at a rising and a falling edge of the output of the comparator.

14. The discharging circuit of claim 13, wherein the edge detection circuit is coupled to the counter circuit, and the pulse signal is configured to reset the counter circuit.

15. A switch mode power supply, comprising:
  an filter coupled to an AC input voltage, the input filter including at least one capacitor;
  a discharging circuit coupled to the input filter, the discharging circuit configured to discharge the capacitor through a discharging current source and a discharging resistor in response to a discharging signal,
wherein the discharging circuit includes:
  an AC voltage sampling circuit for providing a sampled rectified AC voltage from the AC input voltage;
  a signal-shaping circuit for providing a time-varying signal derived from the sampled rectified AC voltage, wherein the time-varying signal characterized by the same frequency as the sampled rectified AC voltage, and the time-varying signal having a first flat portion that is configured to intersect a falling portion of the sampled rectified AC voltage and a second flat portion that is configured to intersect a rising portion of the sampled rectified AC voltage;
  a comparator circuit for comparing the sampled rectified AC voltage and the time-varying signal; and
  a counter circuit configured to provide the discharge signal in response to an output of the comparator circuit.

16. The power supply of claim 15, wherein the signal-shaping circuit comprises:

a bidirectional diode device having a first terminal coupled to the sensing node and a second terminal coupled to an input terminal of the comparator, the bidirectional diode device having a first diode device and a second diode device between the first and the second terminals, wherein the first terminal of the bidirectional device is coupled to an anode of the first diode device and a cathode of the second diode device, and the second terminal of the bidirectional device is coupled to a cathode of the first diode device and an anode of the second diode device; and a capacitor having a first terminal coupled to the bidirectional diode device and a second terminal coupled between the input terminal of the comparator and ground.

17. The power supply of claim 16, further comprising an edge detection circuit coupled to the comparator to produce a pulse signal at a rising and a falling edge of the output of the comparator.

18. The power supply of claim 17, wherein the edge detection circuit is coupled to the counter circuit, and the pulse signal is configured to reset the counter circuit.

\* \* \* \* \*